United States Patent [19]

Wang

[11] 4,177,396
[45] Dec. 4, 1979

[54] ELECTRIC MOTORS

[75] Inventor: Patrick Wang, Chai Wan, Hong Kong

[73] Assignee: Johnson Electric Industrial Manufactory Limited, Chai Wan, Hong Kong

[21] Appl. No.: 847,656

[22] Filed: Nov. 1, 1977

[30] Foreign Application Priority Data

Dec. 10, 1976 [FR] France ................. 76 37298

[51] Int. Cl.² ......................................... H02K 11/00
[52] U.S. Cl. .................................. 310/68 C; 310/239
[58] Field of Search ............... 310/68 R, 68 C, 239, 310/219, 71; 361/26, 32

[56] References Cited

U.S. PATENT DOCUMENTS

| 1,664,089 | 3/1928 | Ringwald | 310/68 C X |
| 3,444,409 | 5/1969 | Lutta et al. | 310/239 |
| 4,045,761 | 8/1977 | Peterson | 310/68 C |

FOREIGN PATENT DOCUMENTS 2352823 4/1975 Fed. Rep. of Germany .
696181 10/1930 France .
2073735 10/1971 France .

*Primary Examiner*—Donovan F. Duggan
*Attorney, Agent, or Firm*—Cushman, Darby & Cushman

[57] ABSTRACT

A d.c. electric motor has a permanent magnet stator and a wound rotor both mounted within a body. An end cover is fixed to the body and carries a thermal switch which is disposed inside the body adjacent to the windings and controls the supply current to the motor.

3 Claims, 3 Drawing Figures

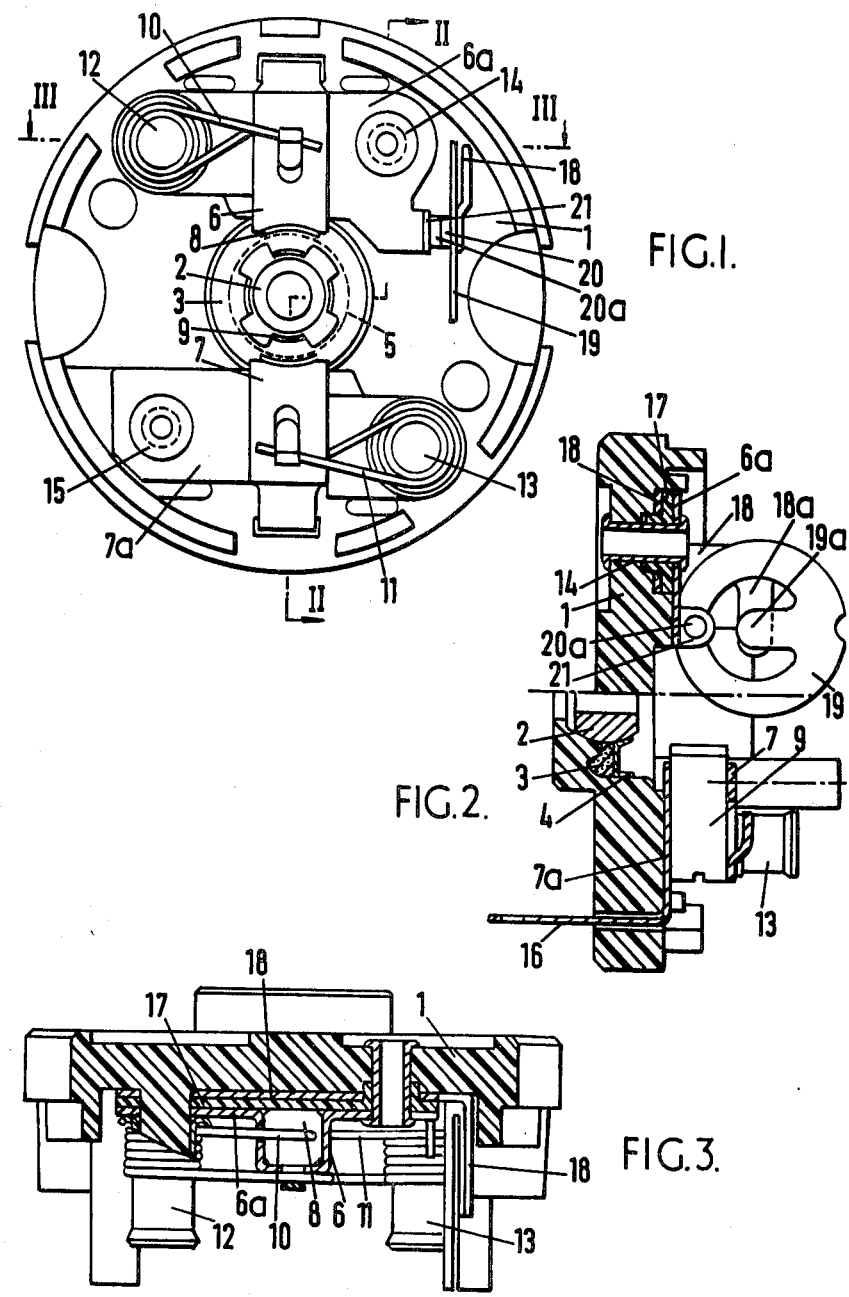

ELECTRIC MOTORS

The present invention relates to electric motors.

It is known to use a thermal switch which is connected in series with the supply to a motor and is disposed outside the body of the electric motor in order to avoid abnormal heating which may lead to deterioration of the motor.

However, such a thermal switch, outside the motor, has a relatively low sensitivity to the rise in temperature of the motor and a relatively inprecise instant of rupture. In fact, in this case, the switch must be adjusted, taking into account the distance from the source of heat and the effects of ventilation outside the motor which may be variable and unforeseen.

It is an object of the present invention to remedy these drawbacks by bringing the thermal switch closer to the source of heat.

In accordance with the invention, there is provided an electric motor comprising a body in which are mounted a stator and a rotor, the stator and/or the rotor having windings, and a heat-sensitive means for interrupting the passage of the supply current for the motor disposed inside the body and near the windings.

Preferably, the motor comprises two brushes engageable with the rotor and mounted to slide in cages fast with a cover fixed to the body, said cover carrying current input terminals.

Preferably, the cover is of insulating material and wherein the heat-sensitive means comprises a thermal switch mounted between one current input terminal and one brush-holder cage.

A motor according to this invention will now be described, by way of example only, with reference to the accompanying drawings, in which:

FIG. 1 is an elevation and plan view of the cover, for closing the body of a motor, on which are mounted the brushes and the thermal switch;

FIG. 2 is a view in section along line II—II of FIG. 1; and

FIG. 3 is a view in section along line III—III of FIG. 1.

FIGS. 1, 2 and 3 show simply a cover 1 for closing the body of an electric motor (not shown in the drawings) in which a stator and a rotor are mounted in known manner.

The cover 1 made of insulating material is provided with a bearing 2, a lubrication felt 3, and a ring 4 for retaining the bearing.

On either side of a bushing 5, shown in broken lines in FIG. 1, are slidably mounted cages 6, 7 for positive and negative brushes 8 and 9 respectively which are subjected to the action of springs 10 and 11 respectively, engaged on lugs 12, 13 integral with the cover 1.

The cages 6 and 7 are fast with plates 6a and 7a which are fixed on the cover 1 by means of rivets 14 and 15 respectively.

The cage 7 of the negative brush 9 is connected by a terminal 16 to the negative pole of the source of supply current whilst the plate 6a of the cage 6 of the positive brush 8 is insulated by an insulating element 17, partially surrounding the rivet 14, from a terminal 18 connected to the positive pole of the source of supply current.

The terminal 18 is extended by a part 18a on which is fixed a tab 19a of an annular bimetallic strip 19 which may be deformed under the action of heat and which constitutes the active element of the thermal switch, said bimetallic strip 19 having on its periphery a stud 20 which may come into contact with a stud 20a fixed on a tab 21 shaped from the plate 6a of the brush-holder cage 6.

When the cover 1 is mounted on the body of the motor, the switch is disposed inside said body and is thus near the hottest part of the windings.

When the motor is functioning normally, the current circulates from the terminal 18 connected to the positive pole of the current via the thermal switch, the studs 20, 20a being in contact, as shown in FIG. 1.

The current is then directed towards cage 6, the spring 10, the positive brush 8, and through the manifold 5 towards the negative brush 9, the spring 11, and cage 7 which is connected via terminal 16 to the negative pole of the current source. The circuit thus closed, the motor is supplied normally for operation.

In the case of overload causing overheating of the windings, the bimetallic strip 19 deforms for a predetermined temperature, this bringing about a displacement of the stud 20 and a breaking of contact with stud 20a. The terminal 18 no longer being connected to the cage 6 of the brush 8, there is an interruption in the circuit and of the supply which causes the motor to stop.

As soon as the bimetallic strip cools down, the studs 20, 20a return into contact, thus re-establishing the continuity of the circuit between the brushes 8 and 9, and the starting up of the motor.

Of course, various modifications may be made by the man skilled in the art to the devices or methods which have just been described without departing from the scope of the invention.

I claim:

1. An electric motor comprising a body, a stator and a rotor mounted within said body, at least the rotor having windings, a cover closing an axial end of said body and supporting two cages and two electrical input terminals, and two brushes each slidable in a respective one of said cages and engaging the rotor to supply current to the windings of the rotor, one of the electrical input terminals being directly connected to one of said cages and the other input terminal being connected to the other cage by way of a bimetal thermal switch, and wherein the bimetal is constituted by a bimetallic annulus having a central tab which is secured to a part of said other input terminal and having on its periphery a contact stud co-operating with a corresponding contact stud electrically connected to said other cage to interrupt the current supply to the rotor windings in response to a predetermined temperature being attained within said body.

2. An electric motor as claimed in claim 1, wherein said other cage is carried by a plate which further supports the said corresponding contact stud and wherein the said other electrical input terminal forms part of a second plate insulated from the first plate and secured to the central tab of the bimetallic annulus.

3. An electric motor as claimed in claim 2, wherein the cover is of an insulating material.

* * * * *